(12) United States Patent
Shinohara et al.

(10) Patent No.: US 8,914,958 B2
(45) Date of Patent: Dec. 23, 2014

(54) METHOD AND APPARATUS FOR INSERTING A VALVE INTO A VALVE GUIDE

(75) Inventors: Tadahiro Shinohara, Tokyo (JP); Satoru Kato, Tokyo (JP); Hideo Kubo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 1028 days.

(21) Appl. No.: 12/595,454

(22) PCT Filed: Mar. 18, 2008

(86) PCT No.: PCT/JP2008/055621
§ 371 (c)(1),
(2), (4) Date: Nov. 25, 2009

(87) PCT Pub. No.: WO2008/126670
PCT Pub. Date: Oct. 23, 2008

(65) Prior Publication Data
US 2010/0139072 A1    Jun. 10, 2010

(30) Foreign Application Priority Data
Apr. 11, 2007    (JP) .............................. P2007-104117

(51) Int. Cl.
*B23P 19/04*   (2006.01)
*B23P 19/10*   (2006.01)
*B23P 19/12*   (2006.01)

(52) U.S. Cl.
CPC .............. *B23P 19/042* (2013.01); *B23P 19/107* (2013.01); *F01L 2103/01* (2013.01); *B23P 19/12* (2013.01)
USPC .......................................... 29/214; 29/281.4

(58) Field of Classification Search
CPC ....... B23P 19/107; B23P 19/042; B23P 19/12
USPC ............................... 29/213.1, 214, 281.4, 428
See application file for complete search history.

(56) References Cited

U.S. PATENT DOCUMENTS 4,845,821 A * 7/1989 Sakimori et al. .............. 29/213.1
4,879,795 A * 11/1989 Nakamura et al. .............. 29/214
(Continued)

FOREIGN PATENT DOCUMENTS

DE    EP155516 A2 *  9/1985
EP    0155516 A2    9/1985
(Continued)

OTHER PUBLICATIONS

Translation of EP-0155516-A2 from espacenet.com, retrieved Jan. 2014.*

(Continued)

*Primary Examiner* — Sarang Afzali
*Assistant Examiner* — Jacob Cigna
(74) *Attorney, Agent, or Firm* — Birch, Stewart, Kolasch & Birch, LLP

(57) ABSTRACT

Upper and lower support members, supporting a valve, are lowered toward a valve guide with at least the lower support member vibrated by a vibrating device. When a lower-end chamfered surface of the valve has failed to be brought into contact with the opening edge of the guide through the lowering, not only the upper support member is caused to gradually move away from an umbrella section of the valve but also the position of supporting, by the lower support member, of a shaft section of the valve is displaced downward after the lower end of the shaft section of the valve contacts the upper end surface of the guide, so that vibrating movement of the lower end of the shaft section is reduced to allow the chamfered surface to contact the opening edge. Then, the valve is inserted into the guide by a pressing member.

2 Claims, 6 Drawing Sheets

(56) References Cited

U.S. PATENT DOCUMENTS

| | | | |
|---|---|---|---|
| 4,879,796 A | * | 11/1989 | Nakamura et al. ............... 29/214 |
| 5,097,579 A | * | 3/1992 | Pringault ......................... 29/214 |
| 5,289,634 A | * | 3/1994 | Makino et al. ............ 29/890.124 |

FOREIGN PATENT DOCUMENTS

| FR | 2861622 A | | 5/2005 |
|---|---|---|---|
| FR | 2861622 B1 | * | 12/2005 |
| JP | 60-123231 A | | 7/1985 |
| JP | 62-015032 A | | 1/1987 |
| JP | 62015032 A | * | 1/1987 |
| JP | 09-087043 A | | 3/1997 |

OTHER PUBLICATIONS

Translation of FR-2861622-B1 from espacenet.com, retrieved Jan. 2014.*

* cited by examiner

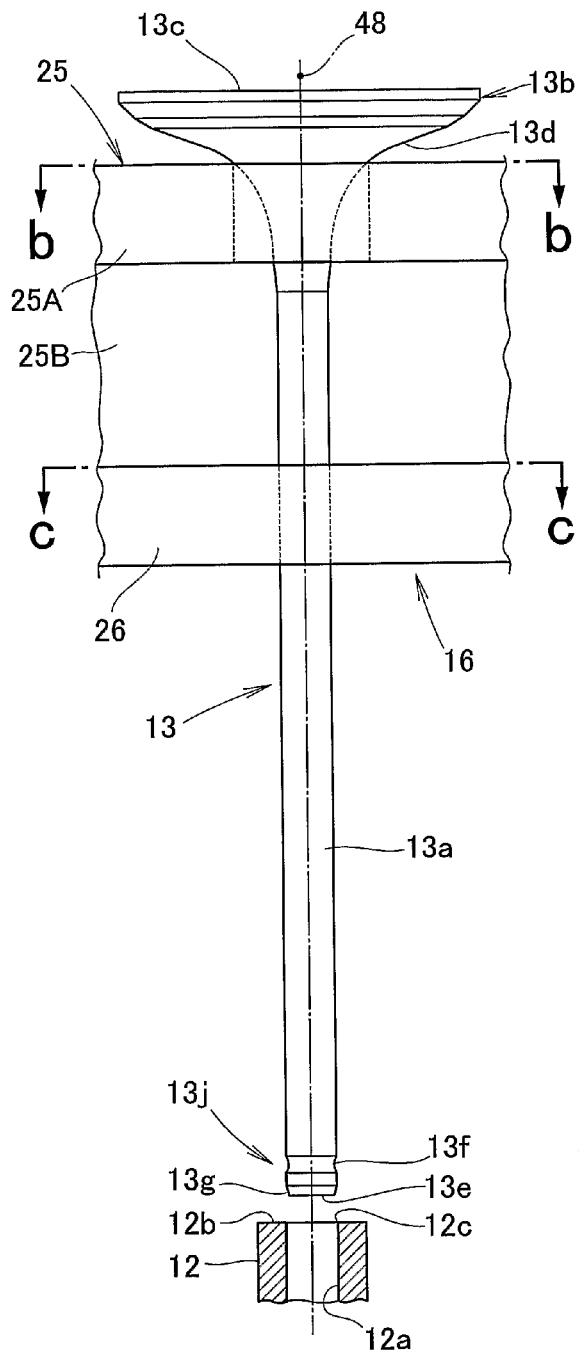
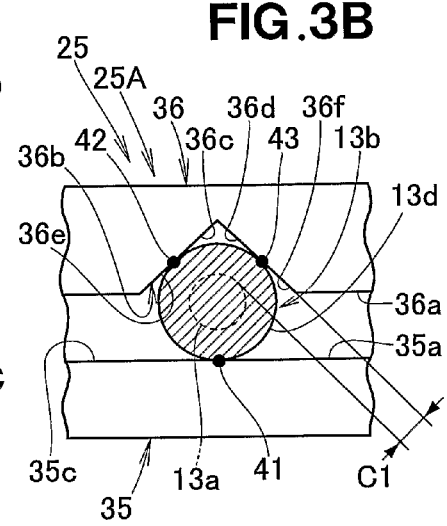
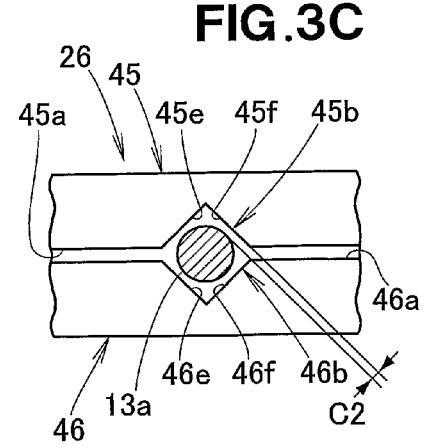

METHOD AND APPARATUS FOR INSERTING A VALVE INTO A VALVE GUIDE

TECHNICAL FIELD

The present invention relates generally to methods and apparatus for inserting a valve into a valve guide.

BACKGROUND ART

Generally, the engine cylinder heads include intake/exhaust valves for opening and closing a passage for an air-fuel mixture flowing into a combustion chamber and exhaust gas flowing out of the combustion chamber. Theses valves each include a shaft section and an umbrella section provided at an end of the shaft section. Valve guide provided in the cylinder head has a small valve inserting hole, and thus, there is provided an extremely small gap between the shaft section and the inner surface of the valve inserting hole when the shaft section is to be inserted into the valve guide. Thus, in assembly lines, the valve insertion operation using a valve insertion apparatus and the like tends to be very difficult, and so there has been a great need for a valve insertion method and apparatus which allow the valve to be readily inserted into the valve guide.

For example, Japanese Patent Application Laid-Open Publication No. SHO-62-15032 (JP 62-015032 A) discloses a method and apparatus for inserting a valve into a valve guide by sucking in the valve. Japanese Patent Application Laid-Open Publication No. HEI-09-087043 (JP 09-087043 A) discloses vibrating a valve, and Japanese Patent Application Laid-Open Publication No. SHO-60-123323 (JP 60-123323 A) discloses a technique for inserting a desired part by vibrating the desired part.

The following lines describe the valve insertion method and apparatus disclosed in JP 62-015032 A, with reference to FIG. 6 hereof. The valve 101 is grasped by a not-shown valve grasping device so as to be moved to a position over the valve guide 102. Then, a valve sucking device 103 is abutted against a stem seal 104 mounted at the lower end of the valve guide 102, and then the valve 101 is sucked by the sucking device 103 so that the valve 101 is inserted into an opening (valve inserting hole) of the valve guide 102. After that, the valve 101 is inserted compulsorily into the valve guide 102 by means of a not-shown valve pressing unit.

FIG. 7 shows a valve burning method disclosed in JP 09-087043 A. Holes 114 and 115 are formed in upper and lower beam sections 112 and 113, respectively, which together constitute a setting jig 111. Engine valve 116 of the valve 116 is inserted into these holes 114 and 115 with an umbrella section 116 located upside. Then, during a high-temperature heating (or burning) process, the setting jig 111 is vibrated to swing a shaft section 118 of the engine valve 116, so that the engine valve 116 is prevented from remaining in a constant posture during the burning to avoid unwanted bending of the engine valve 116.

FIG. 8 shows a method disclosed in Patent Literature 3, which is designed to insert an automatic transmission spool into a valve body. Magazine having a plurality of spools inserted in advance in a plurality of holes formed therein is properly positioned relative to the valve body 132 and placed on the valve body 132. Then, the magazine 131 and valve body 132 are vibrated by a vibrator 133 so that the spools are caused, by the vibration, to move from the holes of the magazine 131 into respective inserting holes formed in the valve body 132.

However, with the valve insertion method disclosed in JP 62-015032 A and shown in FIG. 6 here, the stem seal 104 may be damaged when the valve sucking device 103 is abutted against the stem seal 104 provided at the lower end of the valve guide 102, the valve guide 102 may wear and deform by the valve sucking device 103 directly abutting against the valve guide 102 if the stem seal 104 is damaged, and a portion of the valve sucking device 103 to be abutted against the stem seal 104 may wear by being abutted against the stem seal 104 a plurality of times. Further, big sucking sound generated by the valve sucking device 103 would degrade the working environment. Further, because the valve sucking device 103 requires a sucking power source, such as a vacuum pump, the apparatus would become complicated in construction.

Further, with the method disclosed in JP 09-087043 A, where the shaft section 118 of the engine valve 116 is caused to swing by vibration during the burning in order to prevent unwanted bending of the engine valve 116, the insertion of the engine valve 116 into the valve guide tends to become difficult because there is provided no means for appropriately reducing the vibration of the shaft section 118.

Furthermore, with the insertion method disclosed in JP 60-123323 A, where the magazine 131 and valve body 132 are vibrated to cause the spools to be inserted, by their own weight, into the respective inserting holes formed in the valve body 132, any of the spools may sometimes fail to be inserted into the inserting hole in the corresponding valve body 132 due to a dimension error between the hole in the magazine 131 and the inserting hole in the valve body 132.

DISCLOSURE OF THE INVENTION

In view of the foregoing, it is an object of the present invention to provide a method and apparatus for inserting a valve into a valve guide reliably and easily by use of a simple construction without causing unwanted wear, deformation and damage of component parts.

In order to accomplish the above-mentioned object, the present invention provides an improved method for inserting a valve, having a shaft section and an umbrella section provided at one end of the shaft section, into a valve inserting hole of a valve guide provided in a cylinder head of an engine, which method comprises the steps of: supporting a surface, adjacent to the shaft section, of the umbrella section by an upper support member and supporting the shaft section of the valve with a gap left therebetween by a lower support member disposed beneath the upper support member; lowering, by an elevator device, the upper and lower support members, supporting the valve, together toward the valve guide with at least the lower support member of the upper and lower support members vibrated by a vibrating device; when a lower end of the valve has been brought into contact with the opening edge of a valve inserting hole of the valve guide as a result of lowering, by the elevator device, of the upper and lower support members, pressing the valve into the valve inserting hole by a pressing member; and when the lower end of the valve has failed to be brought into contact with the opening edge of the valve inserting hole of the valve guide as the result of lowering, by the elevator device, of the upper and lower support members, further lowering the upper and lower support members after the lower end of the shaft section contacts an upper end surface of the valve guide, to thereby not only cause the upper support member to gradually move away from the umbrella section but also cause a position of supporting, by the lower support member, of the shaft section to be displaced downward so that vibrating movement of the lower end of the shaft section, caused by at least the lower support member being vibrated by the vibrating device, is reduced and thus the lower end of the valve comes to contact the opening edge of the valve inserting hole; and pressing the valve into the valve inserting hole by the pressing member.

As the vibrating device vibrates at least the lower support member of the upper and lower support members, the shaft section of the valve is caused, through the vibration by the vibrating device, to swing, rotate about its own axis and move on and along the respective inner surfaces of the upper and lower support members supporting the valve (such swing, rotation and movement along the inner surfaces will be collectively referred to as "valve movement").

When the lower end of the valve has been brought into contact with the opening edge of the valve inserting hole of the valve guide as the result of the lowering, by the elevator device, of the upper and lower support members with at least the lower support member vibrated by the vibrating device, the valve is pressed into the valve inserting hole by the pressing member.

If the lower end of the valve has failed to be brought into contact with the opening edge of the valve inserting hole of the valve guide as the result of lowering, the upper and lower support members are further lowered after the lower end of the shaft section contacts the upper end surface of the valve guide. Consequently, not only the upper support member gradually moves away from the surface, adjacent the shaft section, of the umbrella section, but also the position of supporting, by the lower support member, of the shaft section (i.e., the position at which the shaft section is supported by the lower support member) is displaced downward so that vibrating movement of the lower end of the shaft section, caused by at least the lower support member being vibrated by the vibrating device, is reduced while vibrating movement of the umbrella section gradually gets greater, and thus, the lower end of the valve comes to contact the opening edge of the valve inserting hole. Then, the valve is pressed into the valve inserting hole by the pressing member.

Once the lower end of the valve comes to contact with the opening edge of the valve inserting hole, the lower end of the shaft section can be automatically centered relative to the valve inserting hole by virtue of the above-mentioned valve movement and thus can be inserted into the inlet of the valve inserting hole. In this condition, the pressing member compulsorily presses the valve into a predetermined position of the valve inserting hole. Namely, the present invention can readily effect centering of the valve relative to the valve inserting hole through the vibration of the valve and thereby insert the valve into the valve inserting hole with an increased ease and reliability as compared to the conventionally-known techniques.

Further, the present invention can eliminate the need for compulsorily applying external pressure to the valve as done in the conventionally-known techniques using air suction of a valve, and the present invention allows the lower end of the valve to be centered relative to the valve inserting valve using the weight of the valve alone. As a result, the present invention can avoid unwanted wear, deformation, damage, etc. of the valve, valve guide, stem seal, etc. and thereby achieve appropriate valve assembly work.

According to another aspect of the present invention, there is provided an improved apparatus for inserting a valve, having a shaft section and an umbrella section provided at one end of the shaft section, into a valve guide, which comprises: a table for placing thereon a cylinder head having the valve guide; a valve grasping device including an upper support member for supporting a surface, adjacent to the shaft section, of the umbrella section and a lower support member disposed beneath the upper support member for supporting the shaft section with a gap left therebetween; an elevator device for moving the valve grasping device in an upward/downward direction; a vibrating device for vibrating at least the lower support member of the upper and lower support members; and a pressing member for compulsorily pressing the valve into the valve guide. Here, the valve grasping device is lowered, via the elevator device, toward the valve guide with at least the lower support member vibrated by the vibrating device. When the lower end of the valve has been brought into contact with the opening edge of a valve inserting hole of the valve guide as a result of lowering, by the elevator device, of the grasping device with at least the lower support member vibrated by the vibrating device, the valve is pressed into the valve inserting hole by the pressing member. When the lower end of the valve has failed to be brought into contact with the opening edge of the valve inserting hole of the valve guide as the result of lowering, by the elevator device, of the upper and lower support members, the valve grasping device is further lowered after the lower end of the shaft section contacts an upper end surface of the valve guide, to thereby not only cause the upper support member to gradually move away from the umbrella section but also cause a position of supporting, by the lower support member, of the shaft section to be displaced downward so that vibrating movement of the lower end of the shaft section, caused by at least the lower support member being vibrated by the vibrating device, is reduced to allow the lower end of the valve to come to contact the opening edge of the valve inserting hole.

As the vibrating device vibrates at least the lower support member of the upper and lower support members, the shaft section of the valve is caused, through the vibration by the vibrating device, to swing, rotate about its axis and move along the inner surfaces of the upper and lower support members supporting the valve ("valve movement").

When the lower end of the valve has been brought into contact with the opening edge of the valve inserting hole of the valve guide as the result of the lowering, by the elevator device, of the upper and lower support members with at least the lower support member vibrated by the vibrating device, the valve is pressed into the valve inserting hole by the pressing member.

If the lower end of the valve has failed to be brought into contact with the opening edge of the valve inserting hole of the valve guide as the result of lowering, the upper and lower support members are further lowered after the lower end of the shaft section contacts the upper end surface of the valve guide. Consequently, not only the upper support member gradually moves away from the surface, adjacent the shaft section, of the umbrella section, but also the position of supporting, by the lower support member, of the shaft section is displaced downward so that vibrating movement of the lower end of the shaft section, caused by at least the lower support member being vibrated by the vibrating device, is reduced while vibrating movement of the umbrella section gradually gets greater, and thus, the lower end of the valve comes to contact the opening edge of the valve inserting hole. Then, the valve is pressed into the valve inserting hole by the pressing member.

Once the lower end of the valve comes to contact the opening edge of the valve inserting hole, the lower end of the shaft section is automatically centered relative to the valve inserting hole by virtue of the above-mentioned valve movement and thus can be inserted into the inlet of the valve inserting hole. In this condition, the pressing member compulsorily presses the valve a predetermined position of the valve inserting hole.

Thus, by only vibrating the valve via at least the lower support member vibrated by the vibrating device and lowering the upper and lower support members, the valve can be automatically centered relative to the valve inserting hole. As a consequence, the apparatus of the present invention can readily and reliably insert the valve into the valve inserting hole with a simple construction, including the conventional valve grasping device, elevator, vibrating device and pressing member similar to those heretofore employed in assembly apparatus, without a need for special devices designed for valve insertion.

Preferably, in the present invention, the shaft section has a chamfered surface formed in the lower end thereof, and the chamfered surface is brought into contact with the opening edge of the valve inserting hole as the upper and lower support members are lowered by the elevator device. With such a chamfered surface, the centering of the valve relative to the valve inserting hole can be facilitated even further, so that the valve can be inserted into the valve guide even more easily.

BRIEF DESCRIPTION OF DRAWINGS

FIGS. 3A-3C are views explanatory of details of a valve and upper and lower support members in the valve insertion apparatus;

BEST MODE FOR CARRYING OUT THE INVENTION

Figure 1:
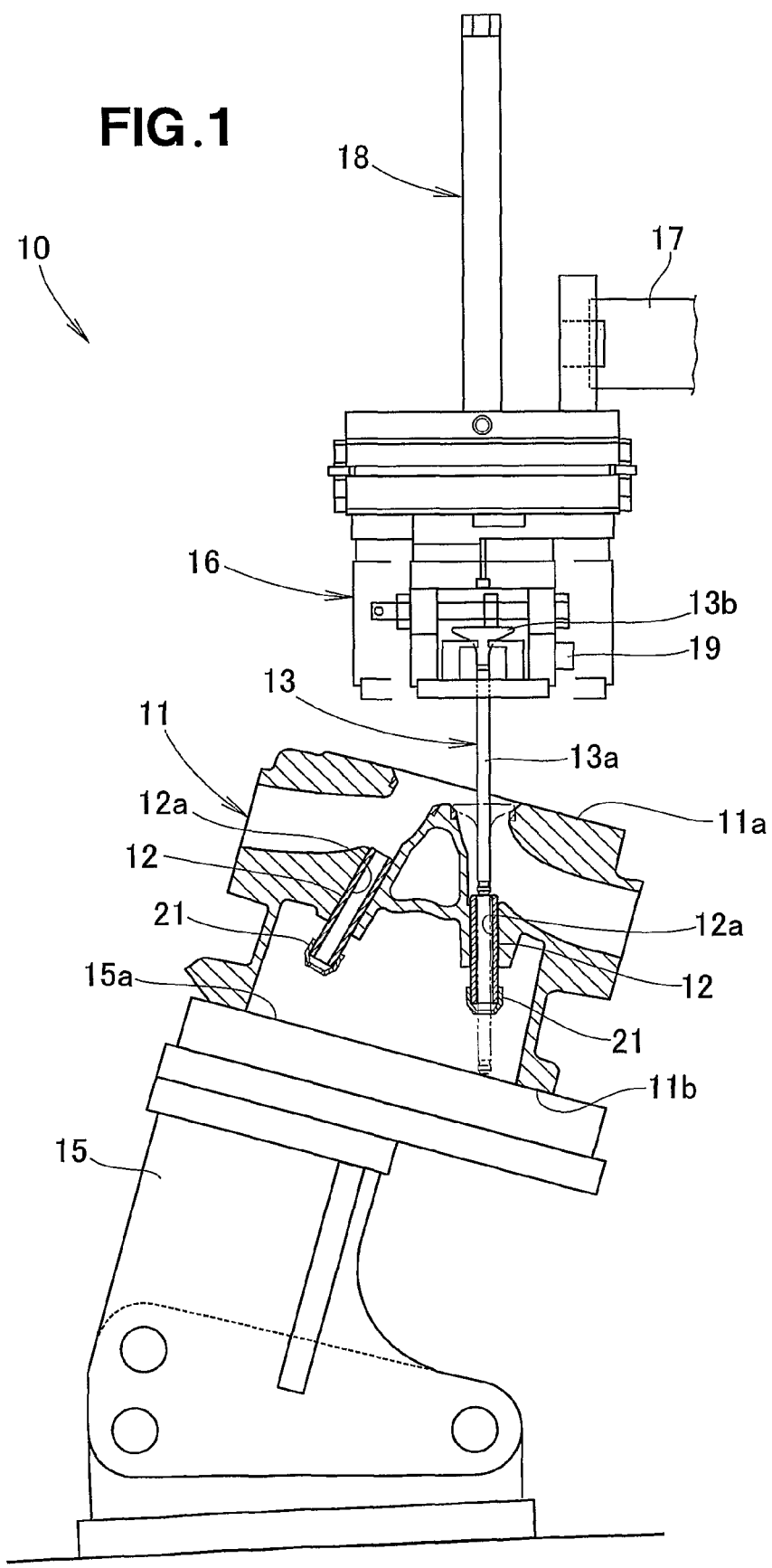
FIG. 1 is a partially-sectional side elevational view of a valve insertion apparatus according to an embodiment of the present invention.

Reference is now made to FIG. 1 showing, in partially section, a valve insertion apparatus according to an embodiment of the present invention, where a cylinder head 11 of an engine is shown in section.

The valve insertion apparatus 10 includes: a slanted table 15 for appropriately positioning and placing thereon the cylinder head 11 to insert a plurality of valves 13 into corresponding valve guides 12 provided in the engine cylinder head 11; a valve grasping device 16 for grasping the plurality of valves 13; an arm 17 provided as an elevator on a robot (not shown) for moving the valve grasping device 16 in an upward/downward direction; a plurality of valve pressing devices 18 mounted over an upper portion of the valve grasping device 16 for compulsorily pressing the valves 12; a vibrating device 19 mounted to the valve grasping device 16; and stem seals 21 provided on lower end portions of individual ones of the valve guides 12.

The cylinder head 11 has a surface 11a to be abutted against a cylinder block and a surface 11b to be covered with a head cover, and the cylinder head 11 is placed on the slanted table 15 with the surface 11a facing upward and the surface 11b facing downward. Further, the cylinder head 11 is positioned relative to the table 15 by means of pins (not shown).

Each of the valve guides 12 is a component part fitted in the cylinder head 11 and has a valve inserting hole 12a formed for insertion therein one of the valves 13.

Each of the valves 13 has a shaft section 13a and an umbrella section 13b formed integrally with an end of the shaft section 13a, and the valve 13 is supported by the valve grasping device 16 with the umbrella section 13b located upwardly of the shaft section 13a.

The vibrating device 19 generates vibration of 273 Hz using air pressure, to thereby vibrate the valve grasping device 16 and hence the valves 13. In the figure, each of the valves 13 is in a standby position immediately above the corresponding valve guide 12 with the axis of the valve 13 vertically aligned with the axis of the inserting hole 12a.

Figure 2:
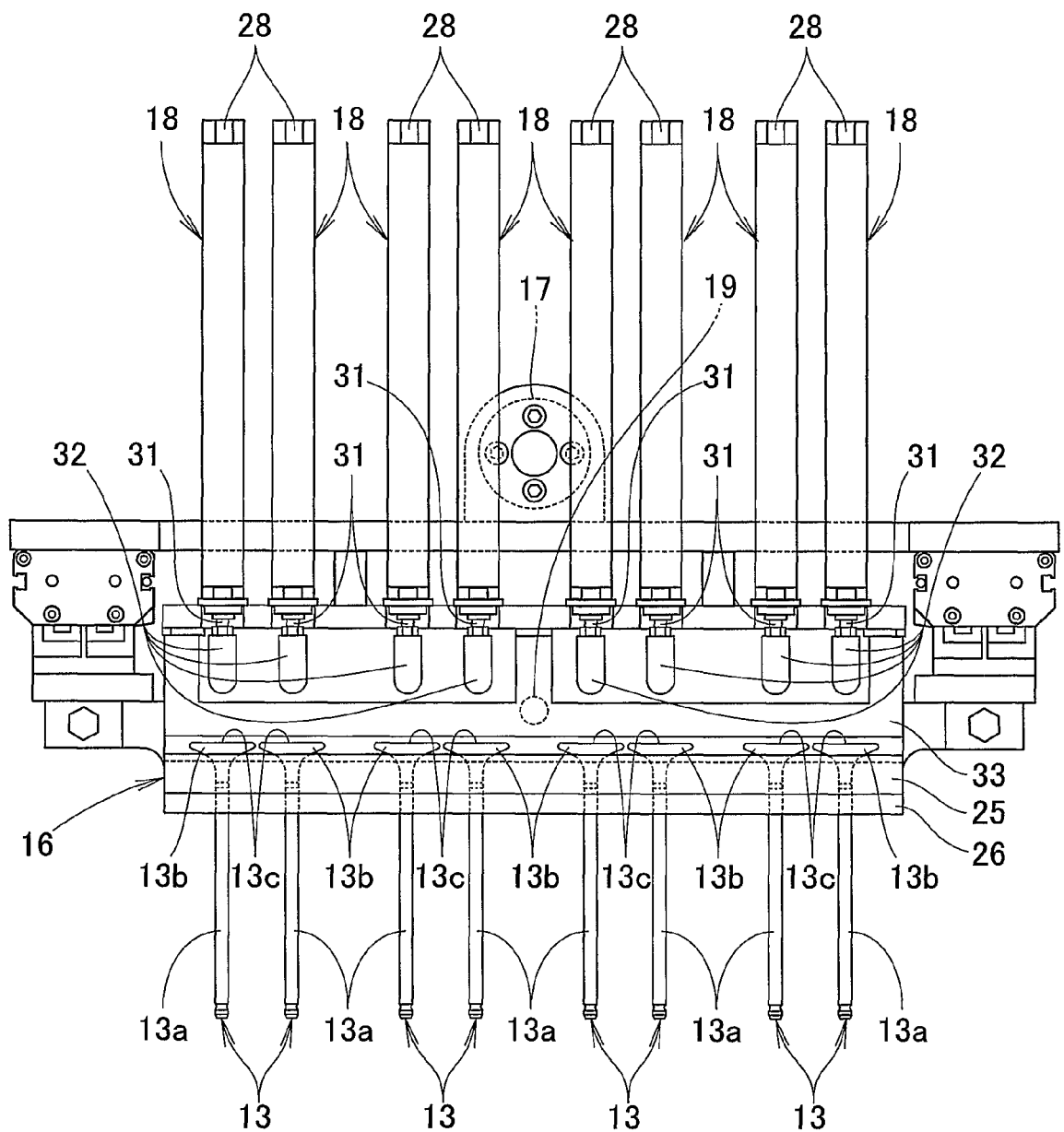
FIG. 2 is a front view of the valve insertion apparatus shown in FIG. 1.

FIG. 2 is a front view showing principal sections of the valve insertion apparatus 16. As shown, the valve insertion apparatus 16 includes an upper support member 25, and a lower support member 26 disposed in contact with the lower surface of the upper support member 25. The upper support member 25 supports the umbrella section 13b of each of the valves 13, while the lower support member 26 supports the shaft section 13a of each of the valves 13.

Air-pressure type cylinder devices 28 are mounted over the valve insertion apparatus 16 in corresponding relation to the valves 13 and located over the corresponding valves 13. Each of the cylinder devices 28 has a rod 31, and a pressing member 32 for pressing a surface 13c of the umbrella section 13b is provided at the distal end of the rod 31.

Each of the valve pressing devices 18 includes the cylinder device 28, a piston (not shown) axially movably provided in the cylinder device 28, the rod 31 attached to the piston, and the pressing member 32 provided at the distal end of the rod 31.

The valve grasping device 16 has a side plate 33, to which are mounted the above-mentioned upper and lower support members 25 and 26 and vibrating device 19.

FIGS. 3A-3C are views explanatory of details of the valves 13 and upper and lower support members 25 and 26.

In FIG. 3A, the upper support member 25 includes a horizontal plate-shaped support body section 25A and a vertical section 25B extending vertically downward from the lower end of the support body section 25A, and the lower support member 26 is disposed in contact with the lower surface of the vertical section 25B. Namely, the lower support member 26 is disposed in spaced-apart relation to the lower surface of the support body section 25A.

Each of the valves 13 is supported at an underside surface 13d of the umbrella section 13b facing the shaft section 13a, so that it is hung substantially vertically over the corresponding valve guide 12.

Each of the valves 13 has an end surface 13e of the shaft section 13a, an annular groove 13f formed immediately above the end surface 13e for receiving an end portion of a valve spring, and a chamfered surface 13g formed in the outer periphery of the end surface 13e.

FIG. 3B is a sectional view taken along the b-b line of FIG. 3A. The upper support member 25 includes a first upper member 35, and a second upper member 36 disposed in opposed relation to the first upper member 35. The first upper member 35 has a flat inner surface 35a, and the second upper member 36 has an inner surface 36a recessed in a triangular or V sectional shape to form a V-shaped groove 36b.

The umbrella section 13b of each of the valves 13 is supported by an upper edge 35c of the inner surface 35a of the first upper member 35 and upper edges 36c and 36d of the V-shaped groove 36b of the second upper member 36. Reference numerals 41, 42 and 43 indicate points of the upper edges 35c, 36c and 36d which the underside surface 13d of the umbrella section 13b contacts; in this way, the umbrella section 13b of each of the valves 13 is supported at the three points 41, 42 and 43. Further, 36e and 36f indicate slanted inner surfaces of the V-shaped groove 36b. Gap C1 is provided between each of the slanted inner surfaces 36e and 36f and the shaft section 13a, and between the inner surface 35a of the first upper member 35 and the shaft section 13a.

FIG. 3C is a sectional view taken along the c-c line of FIG. 3A. The lower support member 26 includes a first lower member 45, and a second lower member 46 disposed in opposed relation to the first lower member 45. The first lower member 45 has an inner surface 45a recessed in a triangular or V sectional shape to form a V-shaped groove 45b, while the second lower member 46 has an inner surface 46a recessed in a triangular or V sectional shape to form a V-shaped groove 46b.

Gap C2 is provided between each of slanted inner surfaces 45e and 45f of the V-shaped groove 45a of the first lower member 45 and the shaft section 13a, and between each of slanted inner surfaces 46e and 46f of the V-shaped groove 46a of the second lower member 46 and the shaft section 13a.

The following paragraphs describe behavior of the valve insertion apparatus 10 constructed in the above-described manner.

In FIG. 3A, only the lower support member 26 or both of the upper and lower support members 25 and 26 are vibrated by the vibrating device 19 (see FIG. 2) with the valves 13 positioned over the corresponding valve inserting holes 12a of the valve guide 12, so that the each of the valves 13 swings to both sides of a vertical line 48. More specifically, the valve 13 is caused, through the vibration by the vibrating device 19 to swing, rotate about its own axis and move on and along the respective inner surfaces of the upper and lower support members 25 and 26 supporting the valve 13.

Then, the valve grasping device 16 is lowered by the arm 17 of the robot (see FIG. 1). If, at that time, the chamfered surface 13g of each of the valves 13 has been brought into contact with an upper-end opening edge 12c of the valve inserting hole 12a of the corresponding valve guide 12, then an end portion 13j of the shaft section 13a can be automatically led into the valve inserting hole 12a. Therefore, the first and second upper members 35 and 36 of the valve grasping device 16 are moved away from each other and likewise the first and second lower members 45 and 46 are moved away from each other, by means of not-shown drive devices, to release the grasping of each of the valves 13. Then, each of the valve pressing devices 18 shown in FIGS. 1 and 2 is activated to cause the corresponding valve 13 to be inserted into a predetermined position of the corresponding valve inserting hole 12a by means of the pressing member 32. Whether or not the valve 13 has been inserted into the predetermined position is detected via a not-shown sensor.

In case the chamfered surface 13g of the valve 13 has failed to be brought into contact with the upper-end opening edge 12c of the valve inserting hole 12a of the corresponding valve guide 12, the following steps are performed.

Figure 4A:
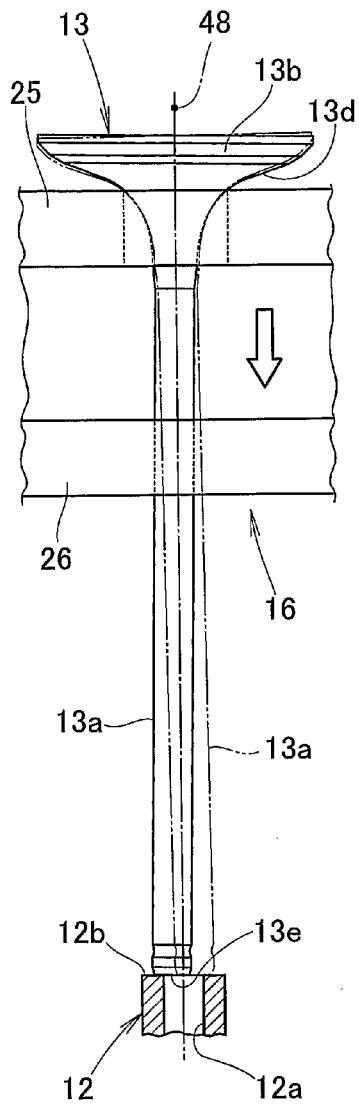
FIGS. 4A-4C are views explanatory of behavior of the valve insertion apparatus.
Figure 4B:
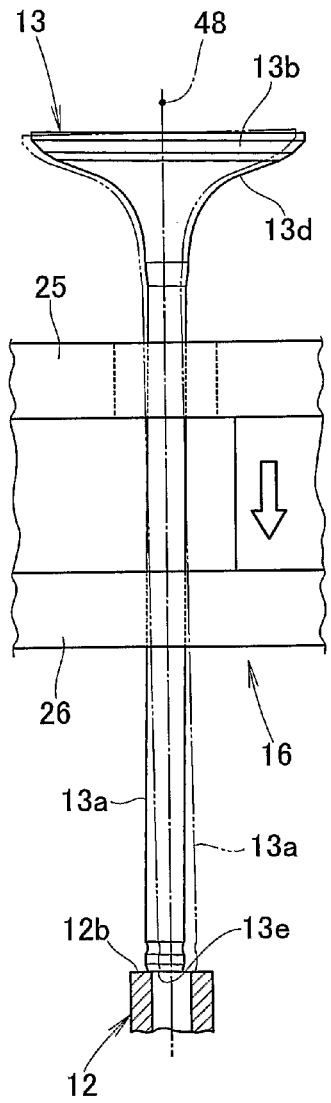
Figure 4C:
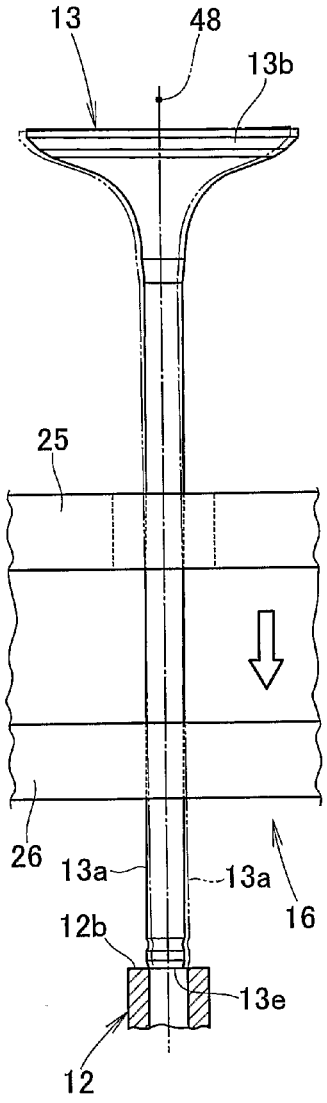

FIGS. 4A-4C are views explanatory of the behavior of the valve insertion apparatus 10. More specifically, FIG. 4A shows a state if the valve 13 has failed to be brought into contact with the upper-end opening edge 12c of the valve inserting hole 12a of the corresponding valve guide 12. Namely, in FIG. 4A, the end surface 13e of the valve 13 has been brought into contact with an upper end surface 12b, not the opening edge 12c, of the corresponding valve guide 12. In the figure, the valve 48 is shown as swinging to both sides of the vertical line 48 by at least one of the upper and lower support members 25 and 26 being vibrated by the vibrating device 19 (see FIG. 2).

In this state, the valve 13 vibrates about a point near the underside surface 13d of the umbrella section 13b supported by the upper support member 25; more specifically, portions at and around the end surface 13e of the shaft section 13a swing more than portions at and around the umbrella section 13b. In this condition, the valve grasping device 16 is further lowered as indicated by a white arrow.

FIG. 4B shows the valve grasping device 16 having been lowered from the position shown in FIG. 4A. In this state, the upper support member 25 is located away from the underside surface 13d of the umbrella section 13b, and thus, the shaft section 13a of the valve 13 is supported by the upper and lower support members 25 and 26 with some gap left between the shaft section 13a and the support members 25 and 26 while vibrating through vibration of the lower support member 26, so that the valve 13 rests, by its own weight, on the upper end surface 12b of the valve guide 12. In that state, the valve 13 vibrates about a point between the upper and lower support members 25 and 26 in such a manner that portions at and around the end surface 13e of the shaft section 13a swing less than in the state of FIG. 4A; this is because, in the state of FIG. 4B, the shaft section 13a is supported by the lower support member 26 at a position lower than in FIG. 4A; namely, the position of supporting, by the lower support member 26, of the valve 13 has been displaced downwardly.

FIG. 4C shows the valve grasping device 16 having been further lowered from the position shown in FIG. 14B. In this state, the center of the vibration of the valve 13 is located at a point between the upper and lower support members 25 and 26 lower than that in FIG. 4B, so that portions at and around the end surface 13e of the shaft section 13a swing less than in the state of FIG. 4B.

Figure 5A:
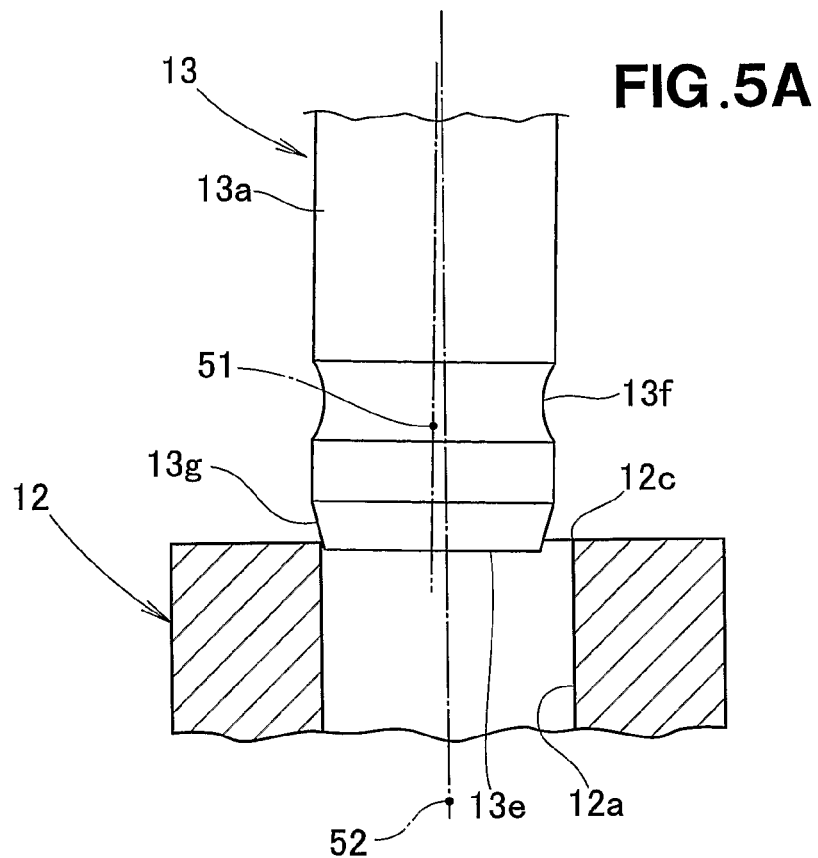
FIGS. 5A and 5B are views further explanatory of the behavior of the valve insertion apparatus.
Figure 5B:
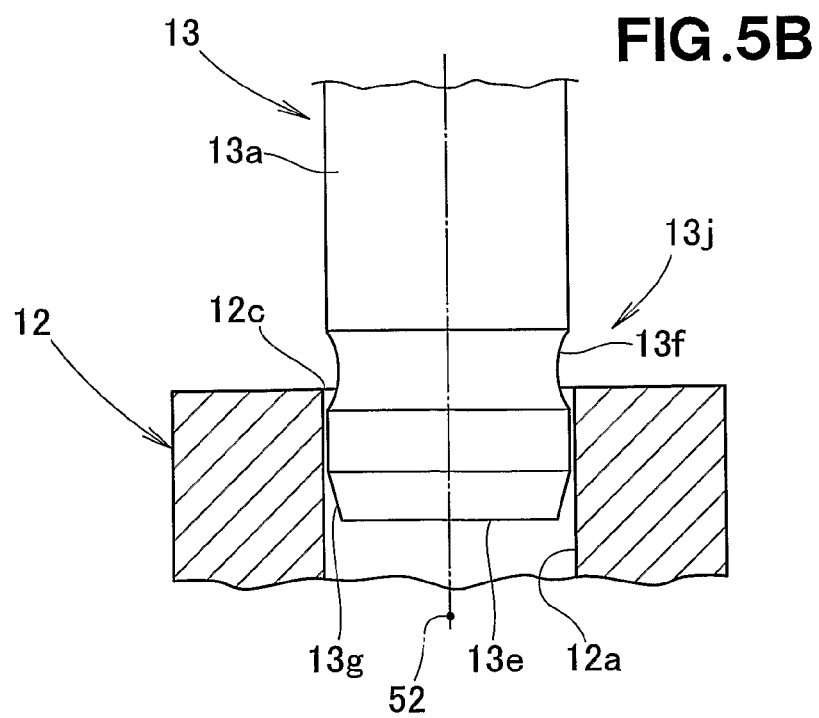
Figure 6:
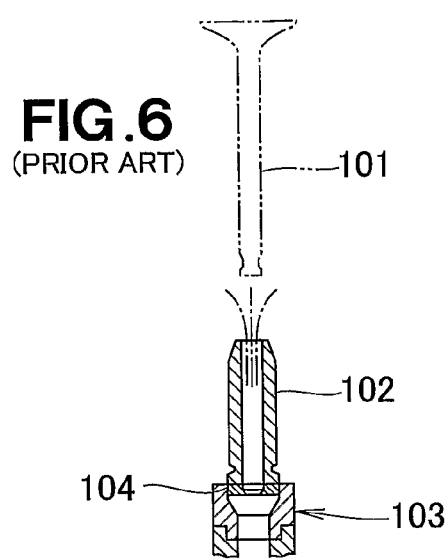
FIG. 6 is a view explanatory of an conventionally known valve insertion method and apparatus.
Figure 7:
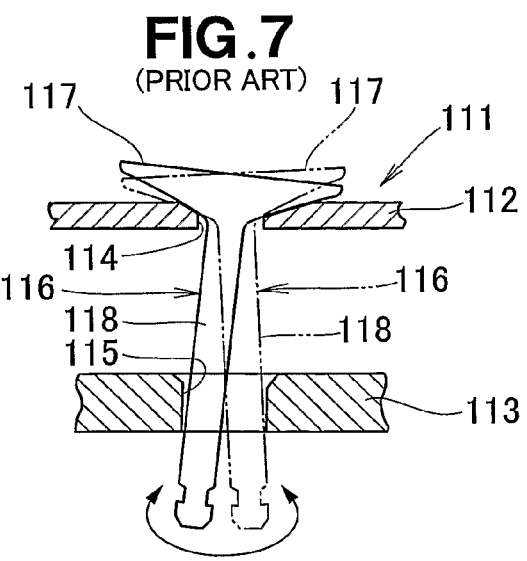
FIG. 7 is a view explanatory of a conventionally-known valve burning method.
Figure 8:
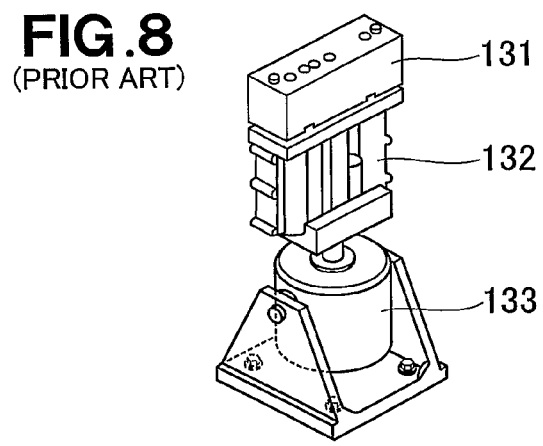
FIG. 8 is a view explanatory of a conventionally-known method for inserting an automatic transmission spool into a valve body.

FIGS. 5A and 5B are views further explanatory of the behavior of the valve insertion apparatus 10.

As the valve grasping device 16 is further lowered, the swinging movement of portions at and around the end surface 13e of the shaft section 13a become smaller so that the chamfered surface 13g of the valve 13 is brought into contact with the upper-end opening edge 12c of the valve inserting hole 12a of the corresponding valve guide 12, as shown in FIG. 5A.

Then, as the chamfered surface 13g moves on and along the upper-end opening edge 12c, the valve 13 is automatically centered by the axis 51 of the valve 13 gradually approaching or agreeing with the axis 52 (coinciding with the vertical line 48 of FIG. 4C). In this way, the end portion 13j of the shaft section 13a can be automatically led into the valve inserting hole 12a, as shown in FIG. 5B.

Thereafter, once the valve grasping device 16 is lowered to a predetermined position, the vibration, by the vibrating device 19 (see FIG. 2), of the valve grasping device 16 is terminated. Then, the first and second upper members 35 and 36 of the valve grasping device 16 are further moved away from each other and likewise the first and second lower members 45 and 46 are further moved away from each other, by means of the not-shown drive devices, so that the valve 13 is released from the grasping by the grasping device 16. Then, the valve pressing device 18 is activated so that the valve 13 is inserted into a predetermined position within the valve inserting hole 12a via the pressing member 32.

As having been described above with primary reference to FIGS. 2, 4 and 5, the valve insertion method of the present invention is constructed to insert the valve 13, having the shaft section 13a and the umbrella section 13b provided at one end of the shaft section 13a, into the valve guide 12 provided in the engine cylinder head 11. More specifically, according to the inventive valve insertion method, the upper support member 25 supports the underside surface 13d of the umbrella section 13b for transfer of the valve 13, and the lower support member 26 disposed beneath the upper support member 25 supports the shaft section 13a with the gap C2 therebetween. Then, the upper and lower support members 25 and 26, supporting the valve 13, are together lowered toward the valve guide 12 with at least one of the support members 25 and 26 and hence the valve 13 vibrated by the vibrating device 19. If the lower end, more specifically the chamfered surface 13g, of the valve 13 has been brought into contact with the opening edge 12c of the valve inserting hole 12a of the valve guide 12 as a result of the lowering of the upper and lower support members 25 and 26, the valve 13 is pressed via the pressing member 32 into the valve inserting hole 12a. If, on the other hand, the lower-end chamfered surface 13g, of the valve 13 has failed to be brought into contact with the opening edge 12c of the valve inserting hole 12a of the valve guide 12 as a result of the lowering of the upper and lower support members 25 and 26, the upper and lower support members 25 and 26 are further lowered after the lower end of the shaft section 13a contacts the upper end surface of the valve guide, so that the upper support member 25 is gradually moved away from the umbrella section 13b and the position the shaft section 13a is supported (i.e., the position of supporting, of the shaft section 13a) by the lower support member 26 is displaced downward. As a consequence, the swinging or vibrating movement of the lower end of the shaft section 13a is reduced, and thus, the lower end or chamfered surface 13g of the valve 13 comes to contact the opening edge 12c of the valve inserting hole 12a. Then, the valve 13 is pressed via the pressing member 32 into the valve inserting hole 12a. Namely, vibrating via the vibrating device 19 the valve 13 on the upper end surface of the valve guide 12 can automatically center the valve 13 relative to the valve inserting hole 12a. As a result, the inventive method can insert the valve 13 into the valve inserting hole 12a with an increased ease and reliability as compared to the conventional counterparts.

Further, the valve insertion method of the present invention can eliminate the need for compulsorily applying external pressure to the valve as done in the conventional techniques using air suction of a valve, and the valve insertion method of the present invention allows the lower end of the valve 13 to be centered relative to the valve inserting valve 12a using only the weight of the valve 13. As a result, the valve insertion method of the present invention can avoid unwanted wear, deformation, damage, etc. of the valve 13, valve guide 12, stem seal 21, etc. and thereby achieve appropriate valve assembling work.

Further, with the valve insertion method of the present invention, where the chamfered surface 13g is formed at the lower end of the shaft section 13a and is brought into contact with the opening edge 12c of the valve inserting edge 12c, the cooperative action between the chamfered surface 13g and the opening edge 12c allows the lower end of the shaft section 13a to be readily centered relative to valve inserting hole 12a, so that the valve 13 can be inserted into the valve guide 12 of the valve with an increased ease and reliability.

Further, the valve insertion apparatus 10 of the present invention is constructed to insert the valve 13 into the valve guide 12 includes: the table 15 for placing thereon the cylinder head having the valve guide 12; the upper support member 25 for supporting the underside surface 13d of the umbrella section 13b for transfer of the valve 13; the valve grasping device 16 including the lower support member 26 disposed beneath the upper support member 25 for supporting the shaft section 13a with the gap C2 therebetween; the robot arm 17 functioning as an elevator device for moving the valve grasping device 16 in the upward/downward direction, the vibrating device 19 for vibrating at least one of the upper and lower support members 25 and 26; and the pressing member 32 for compulsorily pressing the valve 13 into the valve guide 12. In the valve insertion apparatus, the valve grasping device 26 is lowered, via the arm 17, toward the valve guide 12 with at least the lower support member 26 of the upper and lower support members 25 and 26 vibrated by the vibrating device 19. If the lower end of the valve 13 has been brought into contact with the opening edge 12c of the valve inserting hole 12a of the valve guide 12 as a result of the lowering of the valve grasping device 26, the valve 13 is pressed via the pressing member 32 into the valve inserting hole 12a.

In case the lower end of the valve 13 has failed to be brought into contact with the opening edge of the valve inserting hole of the valve guide 12, the valve grasping device 16 is further lowered after the lower end of the shaft section contacts an upper end surface of the valve guide 12, to thereby not only cause the upper support member 25 to gradually move away from the umbrella section 13b but also cause the position of supporting, by the lower support member, of the shaft section to be displaced downward so that the vibrating movement of the lower end of the shaft section, caused by at least the lower support member 26 being vibrated by the vibrating device 19, is reduced to allow the lower end of the valve to come to contact the opening edge of the valve inserting hole 12a.

Thus, by only vibrating the valve 13 by the vibrating device 19 via at least the lower support member 26 and lowering the upper and lower support members 25 and 26, the valve 13 can be automatically centered relative to the valve inserting hole 12a. As a consequence, the valve insertion apparatus 10 of the present invention can readily and reliably insert the valve 13 into the valve inserting hole 12a with a simple construction, including the conventional-type valve grasping device 16, arm 17 functioning as the elevator, vibrating device 19 and pressing member 32 similar to those employed in the conventional assembly apparatus.

Whereas the preferred embodiment has been described above in relation to the case where the lower support member 26 is disposed in contact with the lower surface of the upper support member 25 as shown in FIG. 2, the lower support member 26 may be disposed beneath the upper support member 25.

Further, in the aforementioned embodiment, the second upper member 36 has the V-shaped groove 36b, and the umbrella section 13b of the valve 13 is supported at three points by the first upper member 35 and second upper member 36. However, the present invention is not so limited; for example, a pair of the first upper members 35 may be disposed in opposed relation to each other, and the valve 13 may be disposed between these first upper members 35 so that the umbrella section 13b is supported at two points by the first upper members 35.

If the lower end of the valve 13 has been brought into contact with the opening edge 12c of the valve inserting hole 12a of the valve guide 12 as a result of the lowering of the valve grasping device 26, the valve 13 is pressed via the pressing member 32 into the valve inserting hole 12a, as described above in relation to FIG. 3A. Alternatively, in this case, the upper and lower support members 25 and 26 may be further together lowered toward a predetermined position near the valve guide 12 as when the lower end of the valve 13 has failed to be brought into contact with the opening edge 12c of the valve inserting hole 12a, after which the valve 13 may be pressed via the pressing member 32 into the valve inserting hole 12a.

INDUSTRIAL APPLICABILITY

The valve insertion apparatus and method of present invention are particularly useful for assembly of engine intake and exhaust valves.

The invention claimed is:

1. A method for inserting a valve, having a shaft section and an umbrella section provided at one end of the shaft section, into a valve inserting hole of a valve guide provided in a cylinder head of an engine, said method comprising the steps of:

supporting a surface, adjacent to the shaft section, of the umbrella section by an upper support member and supporting the shaft section of the valve with a gap left therebetween by a lower support member disposed beneath the upper support member;

lowering, by an elevator device, the upper and lower support members, supporting the valve, together toward the valve guide with at least the lower support member of the upper and lower support members vibrated by a vibrating device;

when a lower end of the valve has failed to be brought into contact with an opening edge of the valve inserting hole of the valve guide as the result of lowering, by the elevator device, of the upper and lower support members, further lowering the upper and lower support members after a lower end of the shaft section contacts an upper end surface of the valve guide, to thereby not only cause the upper support member to gradually move away from the umbrella section but also cause a position of supporting, by the lower support member, of the shaft section to be displaced downward so that vibrating movement of the lower end of the shaft section, caused by at least the lower support member being vibrated by said vibrating device, is reduced to allow the lower end of the valve to come into contact with the opening edge of the valve inserting hole; and pressing the valve into the valve inserting hole with a pressing member.

2. The method of claim 1, wherein said shaft section has a chamfered surface formed in the lower end thereof, and the chamfered surface is brought into contact with the opening edge of the valve inserting hole as the upper and lower support members are lowered by the elevator device.

* * * * *